Figure 1:
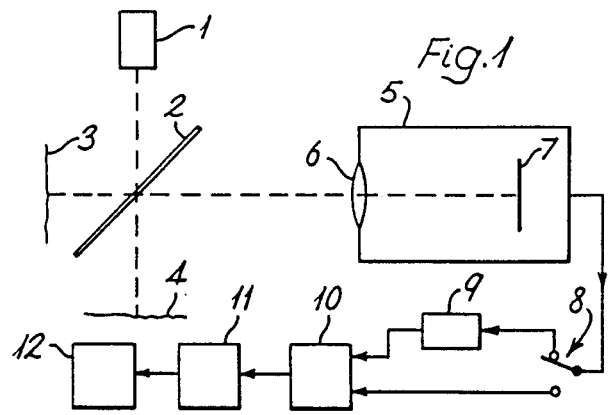

United States Patent [19]

Tyrer

[11] Patent Number: 4,832,494
[45] Date of Patent: May 23, 1989

[54] OPTICAL INSPECTION

[75] Inventor: John R. Tyrer, Ratcliffe on the Wreake, England

[73] Assignee: National Research Development Corporation, London, England

[21] Appl. No.: 57,028

[22] Filed: Jun. 3, 1987

[30] Foreign Application Priority Data

Jun. 5, 1986 [GB] United Kingdom ............... 8613635

[51] Int. Cl.$^4$ ............................................. G01B 9/02
[52] U.S. Cl. .................................... 356/354; 356/359
[58] Field of Search ............... 356/35.5, 354, 359; 73/655, 657

[56] References Cited

U.S. PATENT DOCUMENTS 4,387,994  9/1983  Balasubramanian .
4,428,675  1/1984  Witherow ........................... 356/347
4,652,131  3/1987  Fercher et al. .

FOREIGN PATENT DOCUMENTS 0126475  5/1983  European Pat. Off. .
1392448  4/1975  United Kingdom .
1593284  7/1981  United Kingdom .

OTHER PUBLICATIONS

Thinh et al., "Speckle Method for the Measurement of Helical Motion of a Rigid Body", Optica Acta, vol. 24, No. 12, pp. 1171-1178, Dec. 1977.
Chiang et al., "Laser Speckle Interferometry for Plate Bending Problems", Applied Optics, vol. 15, No. 9, pp. 2199-2204, 9/76.
Lokberg, "Use of Chopped Laser Light in Electronic Speckle Pattern Interferometry", Applied Optics, vol. 18, No. 14, pp. 2377-2384, 7/79.

Primary Examiner—Davis L. Willis
Assistant Examiner—Matthew W. Koren
Attorney, Agent, or Firm—Cushman, Darby & Cushman

[57] ABSTRACT

A method of optical inspection involving laser speckle pattern interferometry comprises comparing two patterns of illumination each resulting from interference and respectively generated by coherent light beams of differing phase or phase wavefront. Apparatus for carrying out such a method comprises at least one coherent light source exhibiting a multimode profile for generating each beam. Application to double pulsed electronic speckle pattern interferometry is particularly appropriate by use of separate sources of variable phase relationship to generate the respective pulses at times which are not constrained as is the case where a common source is used.

9 Claims, 1 Drawing Sheet

OPTICAL INSPECTION

This invention concerns optical inspection involving speckle pattern interferometry.

Such interferometry as propounded to date can be generally expressed as the comparison of the point-by-point variations of intensity of two patterns of illumination each of which results from the interference of first and second beams of light derived from a coherent source, and with at least the first beam for each pattern being scattered, before interference with its respective second beam, from a surface to be inspected.

Typically, the two patterns are produced in sequence with the first beams being scattered from the same surface and the comparison indicating changes in the surface conditions, such as due to vibration.

Such a technique requires that a representation of the first pattern be produced to enable the same to be stored for comparison. In initial development a photographic representation was produced to serve as a mask for comparison with the second pattern, but this is time-consuming. Subsequent development has involved electronic representation by way of video signals and this is, of course, faster. This development is now commonly referred to as electronic speckle pattern interferometry, or ESPI, and it is described in UK Pat. No. 1,392,448.

In any event, speckle pattern interferometry has, to date, been assumed to require that the phase relationship between the beam wavefronts should be essentially constant in respect of both the inter-beam relationship associated with each individual pattern and between the beams associated with the two patterns, whereby the patterns are phase referenced in such a way that comparison is viable. In terms of practical implementation this assumption requires, in turn, the use of coherent sources, such as lasers operable in a single transverse mode, which afford phase stability and this is restrictive.

The above assumption is now found to be incorrect. More specifically it has been found that a viable comparison can be made when the beams associated with the two patterns are of different phase or phase wavefront and the present invention accordingly provides such a method of inspection, or apparatus therefor, in which this is the case.

It is to be noted that there should be no significant variation in phase during the production of any one pattern which is to be compared. However, this is not problematical insofar as each such pattern normally results from effectively instantaneous illumination.

Also it is still appropriate to the invention that the inter-beam phase relationship be sustained for each pattern but, again, this is not problematical because it is normal to derive he first and second beams from a common source for any one pattern whereby the relationship is automatically sustained, and the same approach is applicable to the invention.

One benefit of the invention is that a greater variety of coherent sources can be employed. For example less costly laser sources are commonly unstable in phase with time in continuous or repetitive operation and they are normally confined to use in association with phase control means, such as Pockels cells, whereby the cost saving is annulled.

Another benefit is available by the use, in place of a single source employed in a dual role to warrant the assumed requirement for phase stability in the production of two successive patterns, of different sources using the same optical paths for each pattern.

A particularly useful application of the present invention which illustrates this last benefit is that of double pulsed ESPI. In this technique as conventionally deployed, two patterns are produced by successive pulsed operation of a common source operating in a single transverse mode. However successive operations of the same source necessarily involve a constraint on the time interval by which such operations are separated and this constraint limits the nature of the surface condition changes which can be investigated. For example, the technique is not readily amenable to investigation of transient vibrations. If, in accordance with the invention, different sources are used to generate the pulses, then the separation interval can be of any desired duration by suitable timing of the sources. Indeed, viewed more generally, it is a relatively straightforward matter to produce from a plurality of sources a succession of pulses having progressively varying separation intervals whereby surface condition changes of a continuously varying or transient nature are open to a fuller analysis.

In order to clarify the invention, the same will now be described further, by way of example, with reference to the accompanying drawings, in which:

FIG. 1 schematically illustrates one form of apparatus according to the invention for use in investigating the deformation of a surface of an object under stress.

Figure 2:
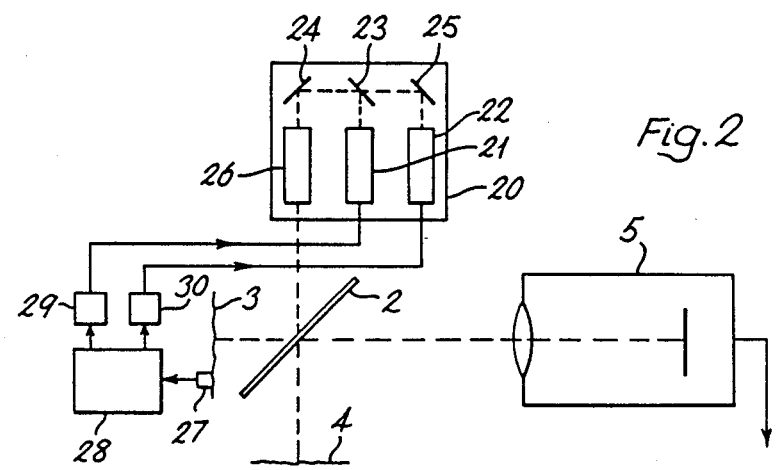

FIG. 2 similarly illustrates another such form of apparatus, and

Figure 3:
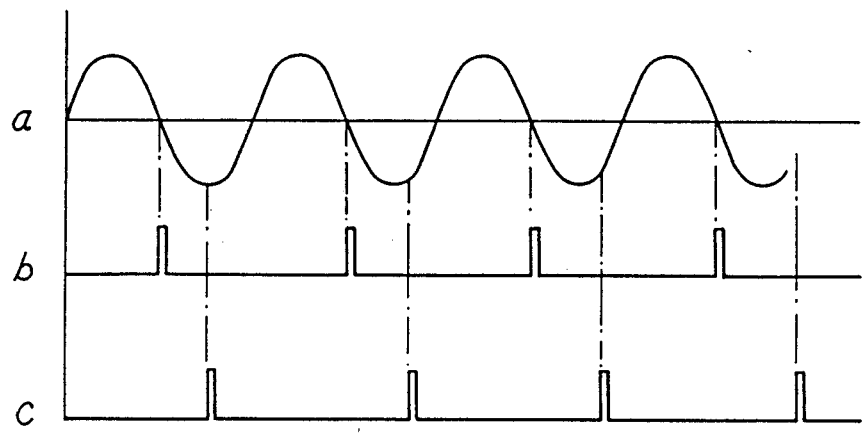

FIG. 3 illustrates timing signals associated with the apparatus of FIG. 2.

The apparatus of FIG. 1 is essentially the same as that of the corresponding figure in the above-mentioned patent, the difference being centred on the form of the coherent light source. It is therefore unnecessary to describe this apparatus in the same detail again: instead an abbreviated description is given below together with a discussion of the differences.

In FIG. 1 a coherent light source, laser 1, projects a beam by way of a semi-reflecting mirror 2 to illuminate the deformable surface 3 and a reference surface 4. Light scattered from the surfaces is conveyed, also by the mirror 2, to a television camera 5 or its equivalent to be imaged by an optical system 6 on a photosensitive screen 7 which can be scanned to produce a video signal representing the point-by-point variations in the image. A video signal related to the surface 3 before deformation is applied through a switch 8 to a storage device 9, whence such signal can be applied as one input to a differencing comparator 10 in synchronism with another video signal related to the surface 3 in a deformed state and applied directly to the comparator by the switch. The comparator output is applied to a detector 11 and thence to a monitor 12 to display a visual representation of the surface deformation of interest.

According to the present invention the laser 1 is of a form which produces a beam of varying phase wavefront rather than essentially constant. As noted above, there should be no significant phase variation during the production of any one pattern to be compared, but this will normally be the case by use of pulsed operation for the laser so that each pattern effectively results from instantaneous illumination. An additional point to note in this connection is that pulsed laser operation is attractive to provide high intensity. Nevertheless, in the event that the laser operation is continuous, an alternative possibility involves an effectively pulsed operation of the camera to generate a video signal which is not subject to significant phase variation.

It will be appreciated that FIG. 1 represents only one example of application of the present invention in previously proposed ESPI and that other such applications are possible. This can be confirmed by further consideration of the invention in association with the above-mentioned patent. Thus, a reference surface is not essential as each pattern can be produced by scattering one beam from the surface of interest while applying the other beam effectively directly to the photosensitive screen. Alternatively, in the case where a reference surface is not used, both beams can illuminate the surface of interest, but in different directions. Also, a deformation is not essential: two nominally identical surfaces can be compared by the use of beams of different wavelengths from one pattern to the other. In yet another variation, the video signal comparison can be effected additively as proposed in UK Pat. No. 1,593,284.

Turning to the question of application of the invention in double pulsed ESPI, FIG. 2 exemplifies this by modification of FIG. 1.

In FIG. 2 the duplicate source is denoted generally at 20. This source includes first and second laser oscillators 21 and 22 which are each arranged for operation in a pulsed manner. These oscillators direct their output beams by way of a semi-reflecting mirror 23 and fully reflecting mirror 24, and by way of a further fully reflecting mirror 25 and then mirrors 23 and 24, respectively, to a laser amplifier 26. The output beam from amplifier 26 is directed by way of the semi-reflecting mirror 2 to surfaces 3 and 4, with light scattered by the surfaces passing to the camera 5 as in FIG. 1.

Operation of the source 20 is related to the nature of the deformation phenomenon to be studied in surface 3. Typically this phenomenon is of a continuously varying or transient nature which is, or can be, repeatedly presented as a cyclic event. In such a situation the event can be detected by a transducer 27 of appropriate form coupled with the surface, either directly or indirectly by way of the mechanism producing the event, and the transducer output can be applied to a signal processor and oscillator 28 to produce a signal output synchronised with the sequence of events. This last output can, in turn, be applied to two pulse generators 29 and 30 to produce respective pulse trains which are applied to control the operation of laser oscillators 21 and 22. One such pulse train will be synchronised with the sequence of events while the other will exhibit a progressive relative phase shift whereby comparison of successive patterns resulting from the surface illuminations shows successive conditions of the surface 3 during a cycle of deformation.

The relationship of the succession of events and pulse trains is clarified by FIG. 3 in which (a) represents the events as sinusoidal variations, (b) indicates the one pulse train synchronised with the events, and (c) indicates the other pulse train with a progressive relative phase shift.

The video signal output from the camera is processed essentially as in FIG. 1 whereby pairs of successive patterns are compared and the differences displayed. Any necessary timing for this purpose, such as at the switch 8, is readily synchronised with the pulsed operation of the source 20.

While the arrangement of FIG. 2 is related to the case of double pulsed operation from a duplicate source, clearly modification to provide a higher level of multiple pulse sourcing is readily practicable. In any event, a significant point to not in relation to the previously conventional approach is that, while the laser amplifier of the present proposal can represent a similar cost to that of the prior single source, the laser oscillators represent a cost while is lower by at least one order.

Also, it will be appreciated that, although the invention is particularly beneficial in terms of the use of multimode sources, the use of two or more single mode sources of individually stable phase is contemplated without the need for mutual phase locking as has previously been thought necessary.

I claim:

1. A speckle pattern interferometric method of optical inspection which comprises performing speckle pattern interferometry by directly monitoring and comparing the point-by-point variations of intensity of two patterns of illumination, each of which patterns results from the interference of first and second beams of light derived from a coherent source, with at least the first beam for each pattern being scattered, before interference with its second beam, from a surface to be inspected, and wherein the beams associated with the two patterns are of indeterminate different phase or phase wavefront.

2. A method according to claim 1 wherein the phase relationship between the first and second beams is the same in the generation of each of the patterns.

3. A method according to claim 2 wherein the first and second beams are derived from a common source for the generation of each pattern.

4. A method according to claim 3 wherein each pattern is generated by the same source.

5. A method according to claim 3 wherein each of the two patterns are generated by the use of respectively different sources.

6. A method according to claim 5 wherein the two patterns are repeatedly generated at successive times by pulsed operation of the respective sources, with one alternating sequence of the overall succession of patterns being generated in regular cyclic manner, and the intervening sequence of patterns being generated in progressive relatively phase shifted manner.

7. A method according to claim 6 wherein the surface to be inspected is repetitively deformed and the pulsed operation of the sources is synchronised with such deformation.

8. A speckle pattern interferometric apparatus comprising:
    illuminating means, including a coherent light source exhibiting in operation a multimode profile, for generating first and second interfering beams at least the first of which is constituted by light from said source and scattered by a surface under examination;
    means for generating at least two video signals, each being a representation of said interfering beams as a speckle interferometry pattern at a time displaced from the time the other of the video signals is generated, said interfering beams of one of said video signals being phase-indeterminate with respect to said interfering beams of the other of said video signals; and
    means for comparing said at least two video signals.

9. A speckle pattern interferometric apparatus as recited in claim 8, wherein said illuminating means comprises:
    a laser amplifier;
    at least two laser oscillators, said laser oscillators each providing a corresponding laser beam to said amplifier; and
    timing means for triggering said laser oscillator in a predetermined time succession.

* * * * *